Jan. 18, 1966  K. WILMOT  3,229,423
CLEANING APPARATUS
Filed Sept. 9, 1963  2 Sheets-Sheet 1
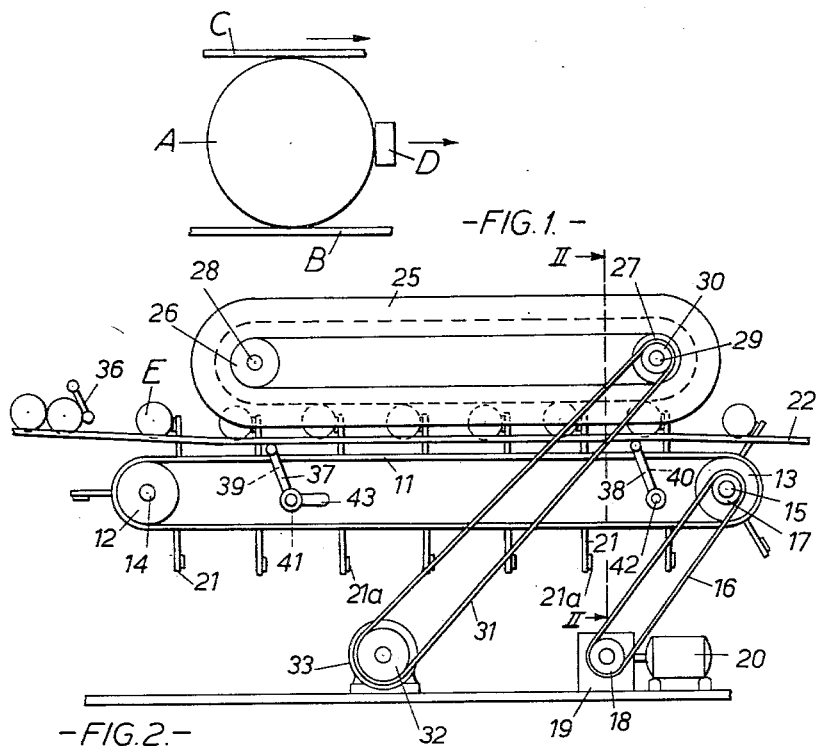
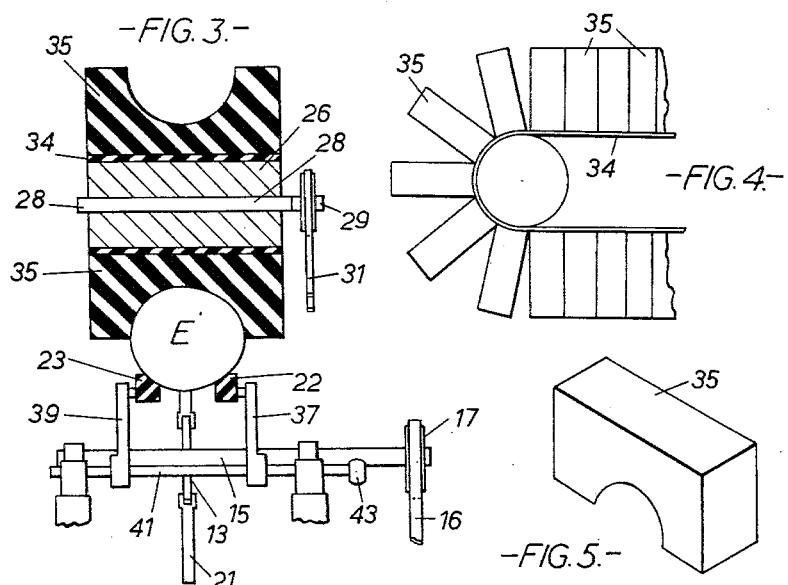
INVENTOR:
KENNETH WILMOT.
BY Irvin S. Thompson
ATTY.

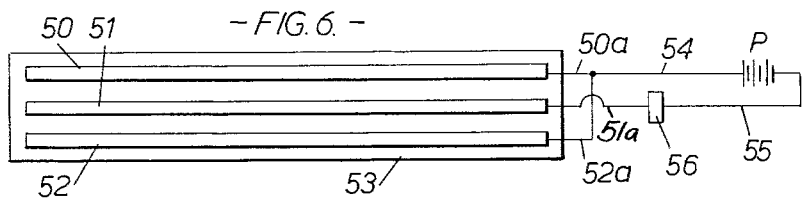
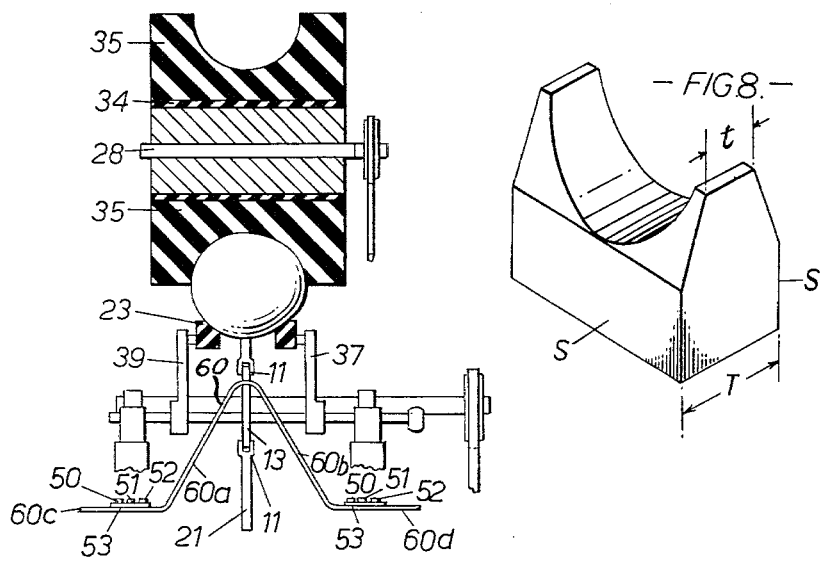
INVENTOR:
KENNETH WILMOT.

United States Patent Office 3,229,423
Patented Jan. 18, 1966

3,229,423
CLEANING APPARATUS
Kenneth Wilmot, Clitheroe, England, assignor to John Blake Limited, Accrington, England, a British company
Filed Sept. 9, 1963, Ser. No. 307,591
Claims priority, application Great Britain, Sept. 19, 1962, 35,662/62
3 Claims. (Cl. 51—138)

The present invention relates to the cleaning of articles and more particularly to the cleaning of peripheral surfaces on articles capable of rolling about at least one axis.

The cleaning of an article having a peripheral surface or surfaces parallel to its rolling axis can be readily accomplished but difficulties are experienced when the peripheral surface of the article is not parallel to the rolling axis and in many cases practical solutions to mechanical cleaning have been so difficult to obtain that they cannot compete with hand cleaning methods.

One example wherein mechanical cleaning has proved difficult to achieve is the cleaning of eggs which are often soiled with blood and yolks of other eggs. The dirty shell often has a very hard or rubbery soiling which is difficult to remove and where machines, such as shot blasters, have been used the shell of unsoiled portions of the egg is often broken before the soiled portion of the egg is cleaned.

The dry cleaning of eggs by hand is often carried out by holding the egg against the recessed periphery of a rotating brush and rotating the egg so that all the fouled egg surface regions are cleaned by the brush action.

In one machine for dry cleaning eggs automatically as above a carriage having a plurality of pockets each pocket capable of supporting an egg therein, is arranged about the periphery of the rotating brush and rotated at a relatively slow speed so that an egg placed in a pocket in one relatively fixed position will be rolled by the carriage through an arcuate path about the periphery of the brush to another fixed position where the egg, can be removed from the pocket. The egg is traversing the arcuate path, lies in contacting engagement with the rotary brush and, because the egg is rotating as it traverses the path, a cleaning of the whole of the surface area of the egg is effected. This machine suffers from a number of disadvantages and the most serious disadvantage is that over a large part of the arcuate contact path an egg broken during the cleaning process tends to fall towards the brush and thereby fouls the brush. Also, the brush necessarily rotates at a relatively high speed, i.e. often above 400 r.p.m. and at this speed a fouled brush tends to centrifuge broken egg parts outwardly so that all the eggs in contact with the brush, the carriage, and other machine parts in the plane of the rotary brush are also fouled and the cleaning of the fouled machine parts is a relatively long and time-wasting task.

It will also be appreciated that cracked or thin shelled eggs are susceptible to breakages in a machine of this kind and the speed of rotation of the brush must be restricted, as otherwise eggs with normal shell thickness can be broken by the harsh brush action so that the output of this machine is relatively limited.

A further object of the present invention is to provide apparatus for automatically cleaning the peripheral surfaces of eggs.

A further object of the invention is to provide apparatus for cleaning eggs which is readily adaptable to take eggs of different sizes.

Another object of the invention is to provide, an apparatus for cleaning eggs, arrangements for stopping the operation of the apparatus in the event of an egg breakage.

According to one feature of the invention, the eggs traverse a horizontal runway and a cleaning surface is arranged to engage continuously a portion of the surface of the eggs during their passage along the runway, the cleaning surface comprising an endless band to which are secured in side-by-side relationship a plurality of individual blocks of flexible foamed rubber each having a shaped portion to conform substantially with the shape of an egg and an abrasive surface on said shaped portion. The cleaning surface is displaced in a path parallel to the runway and the rolling speed of the eggs is controlled so that the maximum peripheral speed of any portion of an egg engageable by the cleaning surface is always different from the linear speed of the cleaning surface.

According to another feature of the invention, the runway consists of a pair of spaced rails which are adjustably displaceable towards and away from the cleaning surface.

According to a further feature of the invention, electrical conductors are located parallel to and beneath the runway and when two adjacent conductors are bridged by liquid from a broken egg, a source of current is connected to a cut-out device which thereupon operates to stop the operation of the apparatus.

According to a feature of the present invention there is provided a machine having means for conveying liquid filled articles along a defined path and comprising moving members for displacing the articles along the defined path, a drive arrangement for displacing the moving members, separate sensing members parallel to but beneath the said defined path, and a cut-out device which operates to stop the drive arrangement when the liquid contents of a broken article bridge at least two adjacent sensing members.

The invention will now be described further by way of example with reference to the accompanying drawings comprising FIGS. 1 to 21. In the drawings:

FIG. 1 shows diagrammatically the elements acting on a cylindrical body subjected to a cleaning operation in accordance with the invention, FIG. 2 shows a side view of a machine for cleaning eggs, FIG. 3 is a section of the line II—II of FIG. 2, FIG. 4 is a detail showing the construction of the abrasive band, FIG. 5 is a perspective detail view of a resilient band block, FIG. 6 shows a diagrammatic plan view of an automatic cut-out arrangement, FIG. 7 is a vertical section through an egg cleaning machine of the type shown in FIG. 2 with the addition of the automatic cut-out arrangement, FIG. 8 shows a modified block structure.

In the example illustrated in FIG. 1, a cylindrical body A of uniform section is supported on a runway B, a belt C in contact with the upper regions of body A is displaced towards the right at uniform linear speed and a block D is located to the right of body A and is displaced towards the right at a uniform linear speed less than that of the belt C.

When the body A is not in contact with the block D and the tangential force exerted by the belt C on body A overcomes the rolling resistance of the body A, then body A will be rotated clockwise and will roll towards the right with a peripheral speed equal to the linear speed of belt C and an axial displacement towards the right also equal to the linear speed of the belt C, subject to no slipping or skid occurring between body A and runway B.

When body A is in contact with the block D the axial displacement of the body A towards the right can only be equal to the linear speed of the block D and the peripheral speed of body A will equal the linear speed of belt C, when the body A slips relative to block D and runway B, or the linear speed of block D, when slip occurs between body A and belt C.

It will be appreciated from the above that when the surface presented by runway B to body A has a higher coefficient of friction than the surface of belt C presented to the body A, the coefficient of friction of the surface presented by the block D to the body A can be selected so that the axial displacement of the body A towards the right will equal the linear speed of block D, the resistance to skid between runway B and body A will ensure a peripheral speed of body A equal to the linear speed of block D and the degree of slip or skid between belt C and body A will be substantially uniform. The greater speed of belt C will maintain body A continuously in contact with block D and the force acting between block D and body A will be substantially uniform.

Consider now that the surface of belt C presented to the body A is coated with an abrasive material and the aforementioned conditions are achieved so that belt C skids at a uniform rate relative to the peripheral surface of body A and it will be seen that the entire peripheral surface of body A presented to the belt C will be scraped uniformly over each complete revolution of the body A.

The machine shown in FIG. 2 sets out to achieve the results described above and the illustrated embodiment has been developed to clean eggs automatically at a very fast rate.

In this embodiment, an endless chain 11 is passed over chain wheels 12 and 13 supported on shafts 14 and 15 respectively and chain 11 is driven by an endless chain 16 passing over a chain wheel 17 securely atttached to shaft 15. The chain 16 is also passed over chain wheel 18 mounted on the output shaft of an infinitely variable speed gearing illustrated by block 19 which is in turn driven by an electric motor 20 and by this means the linear speed of chain 16 can be infinitely varied.

A plurality of brake levers 21 are attached to chain 11 at equally spaced intervals so as to stand outwardly from the chain 11 and the levers 21 on the upper run of chain 11 project upwardly between two spaced parallel rails 22 and 23. The surfaces of rails 22 and 23, which form the bearing surfaces for eggs E passing through the machine, are formed of or coated with rubber as indicated by crosshatching in FIGS. 3 and 7 and each lever 21 has a felt pad 21a over that portion of its surface which will project upwardly above rails 22 and 23.

An abrasive band, generally indicated by reference numeral 25, is arranged above rails 22 and 23 and band 25 is passed over rollers 26 and 27 mounted on rotatable shafts 28 and 29 respectively, shaft 29 having a drive chain wheel 30 secured thereon. An endless chain 31 is passed over chain wheel 30 and over a chain wheel 32 secured on the output shaft of an electric motor 33 and the direction of rotation of chain wheel 32 is such that the lower run of endless band 25 is displaced in the same direction as the upper run of chain 11 but at a greater linear speed than chain 11.

The band 25 is shown in greater detail in FIG. 4 and generally comprises an endless band 34 with a plurality of substantially resilient blocks 35 attached thereto in side-by-side relationship so as to present a substantially continuous block form on the upper and lower runs of band 34. The flexible material of band 34 and the resilient material of blocks 35 are indicated by crosshatching in FIGS. 3 and 7. Each block 35 has a cut out in the surface remote from the band 34 and the cut outs on all the blocks are identical so that they form a continuous depression in the surface of the block formation on the upper and lower runs of band 25. The section of the cut out in each block 35 and thereby the section of the depression formed in the blocks on the upper and lower runs of band 34 conform substantially with the section of the article to be cleaned e.g. an egg, over that part of the egg section above the longitudinal axis of the egg. The depression is slightly deeper than the greatest radius of the egg so that the edges of the cut outs on the lower run of the band 25 lie below the rolling axis of an egg lying on rails 22 and 23.

The surface of the cut outs in blocks 35 are treated with a non-toxic abrasive which may be applied by coating the surface of the cut out with an adhesive, covering the adhesive with a non-toxic abrasive in granular form, flexing the block so that part of the adhesive and the abrasive become worked into the surface of the cut out and then allowing the adhesive to set.

The operation of the machine shown in FIG. 2 will now be described.

With motors 20 and 33 operated to rotate endless chain 11 and the abrasive band 25 respectively, eggs E to be cleaned are placed on the lead-in portion of rails 22 and 23 shown to the left of FIG. 2 and a gate 36 releases one egg E each time chain 11 advances a lever 21 around chain wheel 12 and between the rails 22 and 23. The eggs E are released by gate 36 on an inclined portion of rails 22 and 23 so that each egg E released can roll down rails 22 and 23 and contact its respective lever 21 before being engaged by the abrasive band 25.

As each lever 21, with an egg E contacting the pad 21a on its rear surface, passes beneath the lower run of abrasive band 25, the relative positions between the rails 22 and 23 and the depression in the lower run of abrasive band 25 causes the egg periphery in a vertical plane passing through the longitudinal axis of the egg to be in pressure contact with the surface of the depression in endless band 25. It will be appreciated that only a relatively small angle of the egg periphery will be in contact with the abrasive surface on the depression in band 25 when viewed along the longitudinal axis of the egg but the path of contact between the egg and the depression will extend from just below the longitudinal axis on one side of the egg, across the top of the egg to a point just below the longitudinal axis on the opposite side thereof.

As stated the egg is in pressure contact with the abrasive depression in band 25 and, due to the resilience of the blocks 35 forming the depression, that portion of the depression in contact with an egg will always conform to the peripheral shape of the egg above the longitudinal axis thereof.

As the chain 11 and the levers 21 thereon are displaced at uniform linear speed, the axes of eggs in contact with the abrasive band 25 will be moving at a uniform linear speed equal to that of the chain 11 and further the peripheral speed of each egg on the egg sections contacting the rails 22 and 23 will also be equal to the linear speed of band 25 due to their non-skidding engagement with rails 22 and 23. It will now be seen that each egg will present its entire external surface uniformly to the abrasive coating on the band 25 each time the egg rotates and, due to the uniform linear speed of the lower run of band 25 being substantially greater than that of chain 11, and thereby the mean peripheral speed of the eggs, the entire surface of each egg will be uniformly scraped each time the egg completes a revolution.

The egg preferably completes at least three revolutions in passing beneath the abrasive band 25 and as the egg passes from beneath band 25 it is engaged on an inclined portion of rails 22 and 23 so that it can roll under gravity, and maintain its contact with its lever 21 until the lever 21 passes over the chain wheel 13 and beneath the rails 22 and 23.

As the eggs lose contact with their levers 21, they can continue rolling down the inclined portion of rails 22 and 23 and may be taken off by any suitable means, such as for example, a conveyor band (not shown).

The resilience of blocks 35 allows for considerable variation in the dimension of eggs and in practice it has been found that the eggs roll uniformly about their longitudinal axis and do not tilt.

It will be appreciated that there is a considerable difference between the dimension of, for example, pullet eggs and hen eggs and as this difference in size would normally be more than the resilience of the blocks 35 can accommodate the bands 25 are preferably made interchangeable and for example two bands may be provided with differently shaped and dimensioned recesses in blocks so that one band can be used for cleaning pullet eggs and the other band for cleaning hen eggs. Most breeders separate pullet from hens and collect the eggs separately so that a simultaneous cleaning of hen eggs and pullet eggs would not take place. The breeder can thus set one band 25 to clean all the hen eggs and then change the band 25 for one with a smaller depression to clean the pullet eggs.

To maintain a pressure difference between the eggs and the band 25 when different sizes of eggs are to be cleaned, the rails 22 and 23 are mounted on articulated arms 37, 38 and 39, 40 respectively, arms 37 and 39 being secured on a shaft 41 and arms 38 and 40 being secured on a shaft 42, shafts 41 and 42 passing beneath the upper run of chain 11. The shafts 41 and 42 will have some friction clutch means (not shown) associated therewith and arm 37 has a handle 43 by which shaft 41 can be rotated to vary the angular position of the articulated arms. It will now be seen that by moving handle 43, the distance between rails 22 and 23 and the band 25 can be varied and the pressure applied between hen eggs with a large depression in the band 25 can be the same as the pressure between pullet eggs and the small depression in alternative band 25.

It will be appreciated that a change of the band 25 to obtain a different size or shape of depression is necessary only where eggs of widely different dimensions are to be cleaned and generally minor differences in egg sizes can be accommodated merely by adjusting the position of the rails 22 and 23 relative to the band 25.

The blocks 35 are preferably made from a foamed rubber or rubber substitute but it will be appreciated that the nature of the band 25 is to some extent dependent upon the nature of the article being cleaned and in most examples any flexible resilient material may be used for the band 25.

The present invention is not restricted to the cleaning of foreign matter from the surfaces of articles and the scraping action of the abrasive band 25 can equally well remove material from the engaged surface of the article to polish or reduce the article size so that the word "cleaning" as used in the specification must be interpreted to include these operations.

It will be appreciated that if an egg breaks whilst being cleaned in a machine of the above type, the band 25, lever 21, chain 11 and rails 22 and 23 will become fouled by the liquid contents of the egg and, unless the moving machine parts are speedily arrested, they will carry the liquid contents of the egg to other parts of the machine and to the eggs passing through the machine so the degree of fouling will be increased. To overcome this problem, a cut-out arrangement can be provided for a machine handling liquid filled articles and FIGS. 6 and 7 show such a device applied to the egg cleaning machine described hereinbefore.

In cut-out arrangement shown in FIG. 6, three electrical conductors 50, 51 and 52 are mounted on an insulating base 53 in parallel relationship and an electrical power source P has one side extended to conductors 50 and 52 over a lead 54 and commoned connecting leads 50a and 52a whilst the other side of power source P is extended to electrical conductors 51 by way of a lead 55, the winding of a relay 56 and a connecting lead 51a.

With the above arrangement the relay 56 cannot be operated until the circuit is completed by an electrical conductor spanning the gap between conductor 51 and conductor 50 or conductor 52.

The relay 56, while operated, is arranged to open the electrical circuit to each driving motor of the cleaning machine and by this means the operation of relay 56 will break all the driving circuits and thus cause the machine to stop.

FIG. 7 shows the cut-out arrangement of FIG. 1 applied to the egg cleaning machine illustrated in FIGS. 2 to 5.

In this example, a cover 60, formed in this case of sheet iron, is arranged directly beneath the upper run of the endless chain 11 and the cover 60 is folded to present two outwardly sloping sides 60a and 60b, each of which has a horizontally extending foot part 60c and 60d respectively thereon. The cover 60 can conveniently run almost the entire length of the upper run of endless chain 11.

The cut-out device applied to the arrangement is identical with that shown in FIG. 6 but in this case two separated bases 53 are provided, the conductor 50 and 52 of both bases 53 are connected to the lead 54, and the conductor 51 have their connecting leads 51a commoned so that an electrical conductor placed across the gap between any one of the conductors 51 and its adjacent conductor 50 or 52 will operate the relay 56.

The bases 53 are arranged one on each horizontally extending foot 60c and 60d of cover 60 with the conductors 50, 51 and 52 parallel with the direction of displacement of the eggs E and the power source P and the gap between each conductor 51 and its adjacent conductor 50 or 52 is such that the liquid parts of a broken egg lying across the conductors 50, 51 and 52 can complete the circuit.

It will now be seen that, with the above arrangement, an egg E is broken during cleaning, will fall between the rails 23 and the liquid parts will then slide down at least one wall 60a or 60b of cover 60 and across the gap between at least one conductor 51 and the adjacent conductor 50 or 52 to complete the circuit to relay 56 and thereby stop the machine.

An alternative construction for the blocks 35 is shown in FIG. 8 and in this embodiment the sides S of the block 35 are partially tapered so that at the outer edges of the recessed side the thickness of the block $t$ is less than the thickness T at the base of the block 35 and by this means a more resilient and flexible outer edge is obtained.

The blocks 35 can have the abrasive secured in their respective cut-outs in the manner described hereinbefore or alternatively the abrasive may be applied to the blocks 35, by other means.

In one alternative method the cut-out in a block 35 is coated with an adhesive, an abrasive is sprinkled on to the adhesive and a second adhessive coating is applied to cover the abrasive. With this construction a considerable reduction of the amount of abrasive lost during cleaning is obtained and, because the first adhesive coat is necessarily worked into the block 35 a finer control of the resilience of the abrasive surface can be obtained.

In the foregoing example the brake levers 21 present felt pads for contact with the articles being cleaned and it will be appreciated that other types of resilient pads made from, for example, rubber or plastics material can be used.

Consider again the example shown in FIG. 1 and it will be seen that if the block D were to be positioned to the left of the figure and displaced towards the right and the frictional force between the body A and runway B was greater than the frictional force between body A and block D and greater than the frictional force between body A and belt C, then belt C could be displaced in the opposite direction to that shown, i.e. towards the left and the body A would still be rotated towards the right by the block D and the peripheral speed of the body A would be equal to the displacement of block D.

In applying this principle to the machine shown in FIG. 2, it only becomes necessary to apply the pads 21a to the opposite sides of brake levers 21 and to reverse the direction of displacement of the band 25 and in this case the brake levers 21 would push the eggs E through the defined path and the cleaning surfaces would be moving in the opposite direction to the portions of the eggs engaged therewith.

With egg cleaning machines constructed in accordance with the present invention the eggs always lie directly beneath the cleaning surface so that eggs broken during cleaning tend to fall away from the cleaning surface and this arrangement reduces or eliminates fouling of the cleaning surface.

It will be appreciated that many modifications and variations will be apparent to persons skilled in the art and such modifications and variations must fall within the scope of the invention.

I claim:

1. In apparatus for dry cleaning eggs, the combination of a substantially horizontal runway for the eggs, means for rolling the eggs in spaced succession along said runway, a cleaning surface continuously engaging a portion of the surface of the eggs during their passage along the runway, said cleaning surface comprising an endless band, a plurality of individual blocks of flexible foamed rubber each having a shaped portion to conform substantially to the shape of an egg and an abrasive surface on said shaped portion and each block attached to said band in side-by-side relationship whereby a substantially continuous block form is presented on the upper and lower runs of the band, means for displacing said cleaning surface in a path parallel to said horizontal runway and means for controlling the rolling speed of the eggs whereby the maximum peripheral speed of any portion of an egg engageable by the cleaning surface is always different from the linear speed of the cleaning surface.

2. In apparatus for dry cleaning eggs, the combination of a substantially horizontal runway for the eggs, means for rolling the eggs in spaced succession along said runway, a cleaning surface continuously engaging a portion of the surface of the eggs during their passage along the runway, means for displacing said cleaning surface in a path parallel to said horizontal runway, means for controlling the rolling speed of the eggs whereby the maximum peripheral speed of any portion of an egg engageable by the cleaning surface is always different from the linear speed of the cleaning surface, electrical conductors parallel to and beneath said runway, a cut-out device, a source of electric current and means responsive to the bridging of two adjacent conductors by liquid from a broken egg for connecting the source of electric current to said cut-out device for operating said cut-out device to terminate the operation of the apparatus.

3. Apparatus as claimed in claim 1, in which said horizontal runway comprises a pair of spaced rails which support the eggs, and means for adjustably displacing said support the eggs, and means for adjustably displacing said

References Cited by the Examiner

UNITED STATES PATENTS

| | | | |
|---|---|---|---|
| 1,749,822 | 3/1930 | Lakeman | 134—6 |
| 1,776,784 | 9/1930 | Cramer | 15—3.13 X |
| 1,802,587 | 4/1931 | Tavender | 134—6 |
| 2,080,198 | 5/1937 | Brandenberg | 15—3.16 |
| 2,408,648 | 10/1946 | Inman | 51—138 |
| 2,497,949 | 2/1950 | Linsmeier | 51—137 |
| 2,579,603 | 12/1951 | Niederer et al. | 51—138 |
| 2,579,604 | 12/1951 | Niederer et al. | 51—138 |
| 2,673,361 | 3/1954 | McCutchan | 15—3.17 X |
| 2,761,256 | 9/1956 | O'Connor | 51—141 X |
| 2,858,554 | 11/1958 | Beck | 15—3.13 |
| 3,097,382 | 7/1963 | Angle | 15—3.13 |

CHARLES A. WILLMUTH, *Primary Examiner.*